United States Patent [19]

Masuko et al.

[11] Patent Number: 4,863,266
[45] Date of Patent: Sep. 5, 1989

[54] METHOD AND APPARATUS FOR MEASURING VEHICLE WHEEL ALIGNMENT

[75] Inventors: Shogo Masuko, Koshigaya; Morihiro Shimada, Tokyo; Hiroshi Fujii, Hiroshima, all of Japan

[73] Assignee: Iyasaka Seiki Limited, Tokyo, Japan

[21] Appl. No.: 90,932

[22] Filed: Aug. 31, 1987

[30] Foreign Application Priority Data

Oct. 7, 1986 [JP] Japan .................................. 61-239900

[51] Int. Cl.⁴ .......................... G01B 11/26; G01B 5/24
[52] U.S. Cl. ................................. 356/152; 33/203.15; 33/203.16; 33/203.17; 33/288; 356/150
[58] Field of Search ........................ 356/141, 152, 150; 33/288, 203.15, 203.16, 203.17, 203.18, 203.19, 203.20

[56] References Cited

U.S. PATENT DOCUMENTS 4,443,951  4/1984  Elsasser et al. .
4,594,789  6/1986  Marino et al. .
4,745,469  5/1988  Waldecker et al. .................. 33/288

*Primary Examiner*—Stephen C. Buczinski
*Attorney, Agent, or Firm*—Finnegan, Henderson, Farabow, Garrett & Dunner

[57] ABSTRACT

An accurate and high-speed measurement of the vehicle wheel alignment is achieved by an optoelectronic, non-contact measurement system. This system includes photoelectric sensors for detecting the distance between a reference vertical plane and a tire side surface of each wheel, and a stepping motor for adjusting the position of the sensors to follow-up the displacement of the wheel in a direction parallel to the longitudinal axis of the vehicle. Operation of the stepping motor is controlled by a microcomputer on the basis of the updated distance data delivered from the sensor inputs. The microcomputer processes the input data to compute a toe-in or a camber of the wheel for the analog or digital display.

11 Claims, 5 Drawing Sheets

METHOD AND APPARATUS FOR MEASURING VEHICLE WHEEL ALIGNMENT

BACKGROUND OF THE INVENTION

1. Field of the Invention

The present invention relates to a non-contact measurement of the wheel alignment of motor vehicles, and more particularly to a method and an apparatus for optoelectronically measuring the vehicle wheel alignment.

2. Prior Art

The wheel alignment is an important requirement for safe and stable travelling of motor vehicles. It is therefore necessary to accurately measure the vehicle wheel alignment at a high speed for enabling proper subsequent adjustment of the wheel alignment based on the result of the measurement.

There are known two types of measurement of vehicle wheel alignment; one is achieved statically and the other dynamically. The dynamic measurement is preferable because it is conducted under conditions substantially the same as the actual vehicle travelling conditions.

According to one such known dynamic measurement system, a pair of axially movable roller-headed feelers or proves is held in contact with a tire side surface at diametrically opposite portions thereof for measuring a toe-in angle and a camber angle on the basis of axial displacements of the respective proves. This system is however disadvantageous in that due to irregularity of the tire side surface, the measurements of a toe-in angle or of a camber angle fluctuate and hence an accurate measurement is difficult to achieve.

Another example of known dynamic measurement system is constructed to detect a side slip force of the tire (i.e., a force urging the tire to slip laterally when a vehicle is running) which varies proportional to the magnitude of toe-in angle of the wheel. This system is however disadvantageous in that the correlation between the side slip force and the toe-in angle is not constant but varies depending on the tread patterns of the individual tires.

As described above, the known dynamic wheel alignment measurement systems are not satisfactory in accuracy because they are negatively affected by the shape, design and deformation of a tire to be measured.

With the foregoing difficulties in view, an artisan might attempt to realize an optical measurement system capable of measuring the wheel alignment without direct contact with a tire. A possible proposal would probably be a system such as shown in FIG. 8 of the accompanying drawings. The system includes a pair of photoelectric sensors S1, S2 disposed near the tire T on a wheel W for measuring the distance between a side surface of the tire T and a reference vertical plane. With this arrangement, however, when the wheel W is rotated by a pair of drive rollers (not shown), it is displaced rearwardly, as indicated by the dotted lines. Relatively to this rearward displacement of the wheel W, measuring points M1, M2 on the tire T are displaced forwardly. With this displacement of the measuring points, the obtained measurements of a toe-in angle $\theta$ necessarily contain an error.

SUMMARY OF THE INVENTION

It is accordingly an object of the present invention to provide a method and an apparatus for accurately measuring the vehicle wheel alignment at a high speed without suffering from negative influence caused by the shape, design and deformation of the tire.

According to the present invention, the foregoing and other objects are attained by a method of measuring wheel alignment of a motor vehicle, comprising the steps of: (a) rotating front and rear wheels of the motor vehicle while retaining the vehicle in a predetermined position; (b) optoelectronically measuring the distance between a reference vertical plane and a side surface of each of the front and rear wheels; (c) during said measuring, adjusting the position of measurement to follow-up a displacement of each wheel in a direction parallel to the longitudinal axis of the vehicle; (d) electronically processing the data obtained by said measuring for computing at least one of toe-in angle and a camber angle of each wheel; and (e) displaying the toe-in angle or the camber angle thus computed.

The method of the present invention is reduced to practice by an apparatus for measuring wheel alignment of a motor vehicle, comprising: (a) drive means for rotating front and rear wheels of the motor vehicle while retaining the vehicle in a predetermined position; (b) means for optoelectronically measuring the distance between a reference vertical plane and a side surface of each of the front and rear wheels; (c) means for adjusting the position of said measuring means to follow-up a displacement of each wheel in a direction parallel to the longitudinal axis of the vehicle; (d) computing means for electronically processing the data obtained by said measuring means to compute at least one of a toe-in angle and a camber angle of each wheel; and (e) means for displaying the toe-in angle or the camber angle thus computed.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

Figure 1:
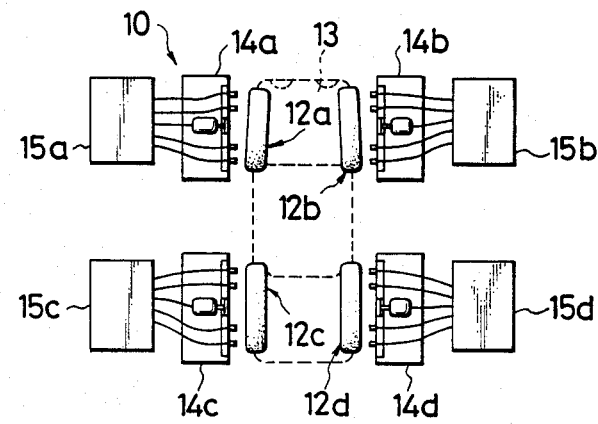
FIG. 1 is a diagrammatic plan view of a vehicle wheel alignment measuring apparatus embodying the present invention.

The principles of the present invention are particularly useful when embodied in an apparatus for measuring vehicle wheel alignment, such as shown in FIG. 1, generally indicated by the reference numeral 10.

The apparatus 10 generally includes two cooperating pairs of drive rollers 11, 11 (only one pair being shown in FIG. 2) for rotating front and rear wheels 12a, 12b and 12c, 12d, respectively, of a motor vehicle 13 while retaining the vehicle 13 in a predetermined position, two pairs of front and rear measuring units 14a, 14b and 14c, 14d between which the front and rear wheels 12a-12d are to be disposed with a predetermined space leaving between each of the wheels 12a-12d and a corresponding measuring unit 14a-14d, and four electronic circuit units 15a-15d connected respectively with the measuring units 14a-14d for electronically processing the data obtained by the measuring units 14a-14d.

All the measuring units 14a-14d are structurally and functionally the same and hence only the right front measuring unit 14b is described hereinbelow in detail with reference to FIG. 2. The measuring unit 14b is slidably mounted on a horizontal base 14b' and laterally movable in a direction perpendicular to the longitudinal axis of the vehicle 13. The measuring unit 14b includes two pairs of photoelectric sensors 16a, 16b and 16c, 16d for optoelectronically measuring the distance between a reference vertical plane and the outer side surface of a tire 17 fixed about the right front wheel 12b. Each of the photoelectric sensors 16a-16d comprises an optical displacement sensor constructed to produce, in such a manner known per se, an analog output signal whose magnitude varies proportional to the distance between the tire side surface and the reference vertical plane. The sensors 16a, 16b or 16c, 16d of each pair of equidistantly spaced from a plane extending in tangent to a circle defining the central diameter $D_0$ (FIG. 4) of the tire 17. The sensors 16a-16d are mounted on a linear support member 18 in aligment with each other and they are disposed in the reference vertical plane in confronting relation to the tire 17.

Figure 7:
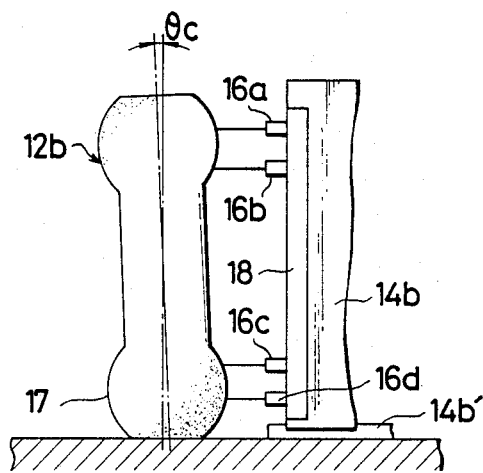
FIG. 7 is a front elevational view of a part of the apparatus, illustrative of the measurement of a camber angle.
Figure 8:
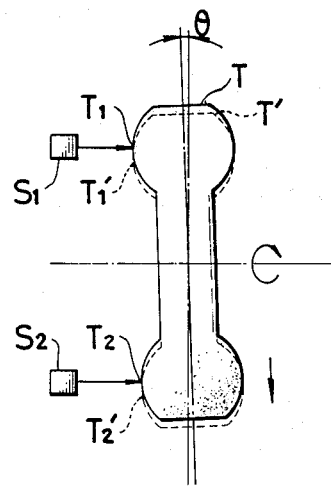
FIG. 8 is a schematic plan view showing another optical measuring apparatus.

The support member 18 is normally held in a horizontal position and extends parallel to the longitudinal central axis of the motor vehicle 13. The support member 18 is angularly movable about its midportion between the horizontal position (FIG. 2) and a vertical position (FIG. 7).

The apparatus 10 further includes a first follow-up means for adjusting the position of measurement to follow-up the displacement of each wheel 12a-12d in a first direction parallel to the longitudinal axis of the vehicle 13, and a second follow-up means for adjusting the position of the measurement to follow-up the displacement of each wheel 12a-12d in a second direction perpendicular to the longitudinal axis of the vehicle 13.

Figure 2:
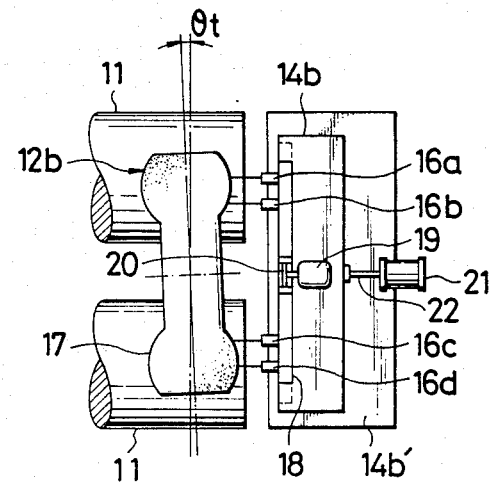
FIG. 2 is an enlarged plan view of a measuring unit of the apparatus shown in FIG. 1.

The first follow-up means (i.e., first adjusting means) comprises, as shown in FIG. 2, a stepping motor 19 operatively connected with the support member 18 via a cam 20. The stepping motor 19 is mounted on the measuring unit 14b, and the cam 20 is coupled with a drive shaft of the stepping motor 19 for co-rotation therewith. The cam 20 is held in driving engagement with the support member 18 so as to convert a stepwise angular motion of the stepping motor 19 into a linear reciprocating motion of the support member 18 in the first direction. The stepping motor 19 is connected with the electronic circuit unit 15b and is driven by the latter to move the support member 18 in synchronism with the movement of the wheel 12b so as to follow-up the displacement of the wheel 12b in the first direction.

The second follow-up means (i.e., second adjusting means) comprises a fluid-actuated cylinder 21 fixedly mounted on the base 14b' and having a piston rod 22 connected to the measuring unit 14b. The cylinder 21 is operatively connected with and driven by the electronic circuit unit 15b to move the measuring unit 14b in the second direction, in synchronism with the displacement of the wheel 12b in the second direction. The cylinder 21 may be operatively coupled with a cylinder (not shown) connected with the measuring unit 12a so as to reciprocate the measuring units 12a, 12b simultaneously in the same direction. With this arrangement, the distance between the side surface of each tire 17 and the corresponding reference vertical plane is always kept constant.

Figure 3:
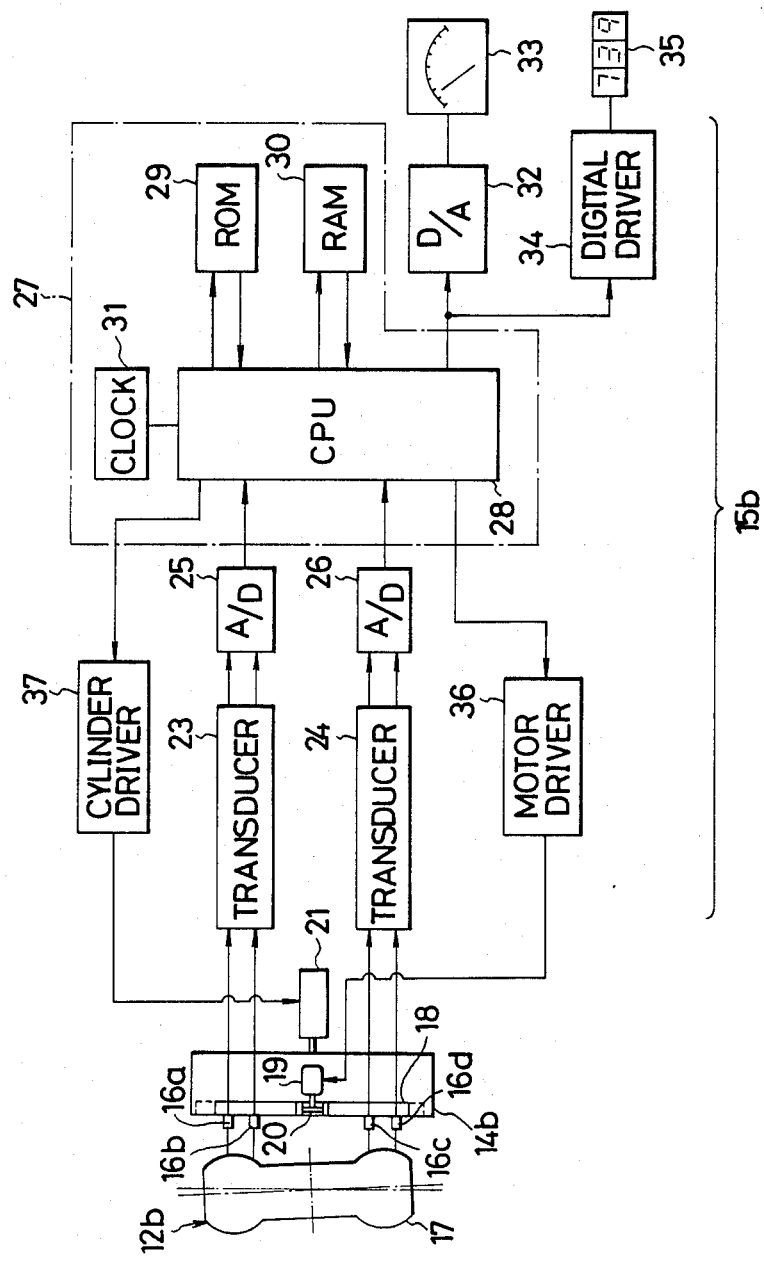
FIG. 3 is a block diagram illustrative of an electronic circuit unit employed in the apparatus.

All the electronic circuits units 15a-15d are structurally and functionally identical and hence only one unit 15b is described hereinbelow in detail with reference to FIG. 3. The electronic circuit unit 15b includes two transducers 23, 24 connected respectively with the two pairs of sensors 16a, 16b and 16c, 16d for producing analog voltage signals corresponding in magnitude to analog input signals received from the respective sensors 16a-16d. The transducers 23, 24 are connected with a pair of analog-to-digital (A/D) converters 25, 26, respectively, so that the analog voltage signals representing the distance between the tire side surface and the reference vertical plane are converted by the A/D converters 25, 26 into digital signals. The digital signals from the A/D converters 25, 26 are then inputted through a data bus consisting of eight lines, into a microcomputer 27 indicated by a chain rectangle. The microcomputer 27 comprises a central processing unit (CPU) 28, a read only memory (ROM) 29, a random access memory (RAM) 30, and a clock pulse generator 31 having a quartz oscillator for generating reference clock pulses. After having been delivered to the microcomputer 27, updated data regarding the status of the foregoing distance are stored in the RAM 30 for a predetermined interval of time (approximately 1.0 second). Upon expiration of this interval of time, the stored data are read out from the RAM 30 and processed in the CPU 28 to obtain a digital output signal indicative of a toe-in angle of the wheel 12b. The digital output signal is then delivered to a digital-to-analog (D/A) converter 32 which in turn produces an analog output signal to be displayed on an analog display unit 33. The digital output signal from the microcomputer 27 is also supplied to a digital driver 34 and then indicated by a digital display unit 35 driven by the digital driver 34.

The microcomputer 27 continuously receives the updated data on the displacement of the wheel 12b from the sensor inputs and, based on the input data, it produces output control signals for enabling the measuring unit 14b to follow-up a displacement of the wheel 14b either in a first direction parallel to the longitudinal axis of the vehicle 13, or in a second direction perpendicular to the first direction. To this end, the output control signals are delivered to the stepping motor 19 and the cylinder 21, respectively, through a stepping motor driver 36 and a cylinder driver 37.

Figure 6:
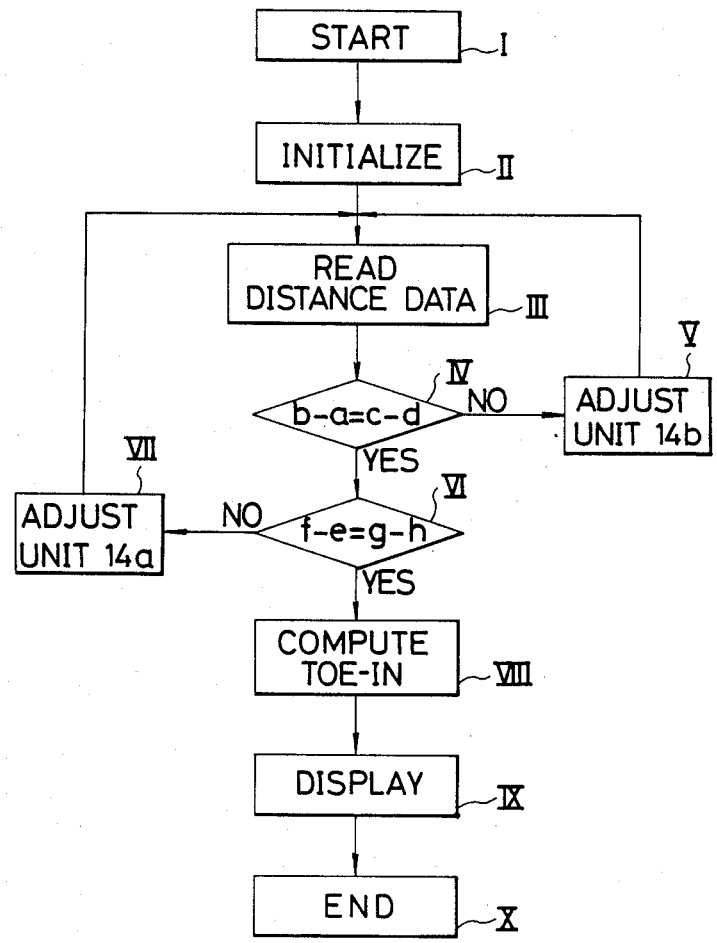
FIG. 6 is a flow chart showing a program main routine achieved in a microcomputer of the electronic circuit unit.

The operation of the microcomputer 27 is described below with reference to the flow chart shown in FIG. 6, in which the measurement of a toe-in of the front wheels 12a, 12b is achieved.

Figure 4:
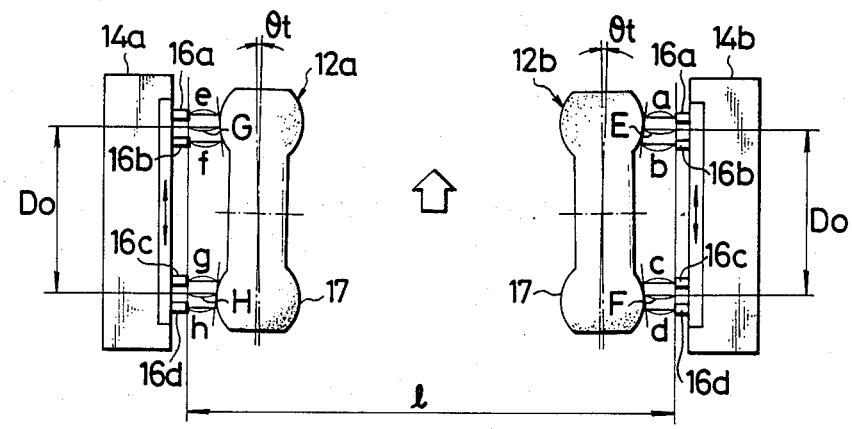
FIGS. 4 and 5 are plan views of a front portion of the apparatus showing the manner in which an toe-in angle of the front wheels is measured by the apparatus.

When a main switch is closed, the microcomputer 27 is driven to proceed the program stored therein from a first step I. In the next step II, the CPU 28 is reset or initialized to clean-up its contents and then the operation proceeds to the following step III in which the data on the distance between each sensor 16a-16d, i.e. the reference vertical plane and the tire side surface of each wheel 12a, 12b are read in.. In the next step IV, the input data are computed to determine whether the right front wheel 12b has been displaced. For this determination, the following equation is used: $b-a=c-d$ where a, b, c or d is a distance between one of the sensors 16a–16d and the tire side surface of the right front wheel 12b (FIG. 4). If the result does not satisfy the foregoing equation, then the operation proceeds in the direction "NO" to a step V in which the position of the measuring unit 14b is adjusted by the stepping motor 19 so as to follow-up the displacement of the wheel 12b until the foregoing equation is satisfied.

On the contrary, when the judgement in the step IV is coincident with the foregoing equation, then the operation proceeds in the direction "YES" to commence a judgement on the left front wheel 12a. This judgement is achieved in a step VI by employing the equation: $f-e=g-h$ where e, f, g or h is the distance between one of the sensors 16a–16d and the tire side surface of the left front wheel 12a. If the judgement does not satisfy the equation, then the operation proceeds in the direction "NO" to a step VII in which positional adjustment of the measuring unit 14a is effected in the same manner as done in the step V. When the last-mentioned equation is ratiofied, the operation proceeds to the next step VIII.

In the step VIII, a toe-in T is computed in accordance with a equation which is derived in the following manner.

Figure 5:
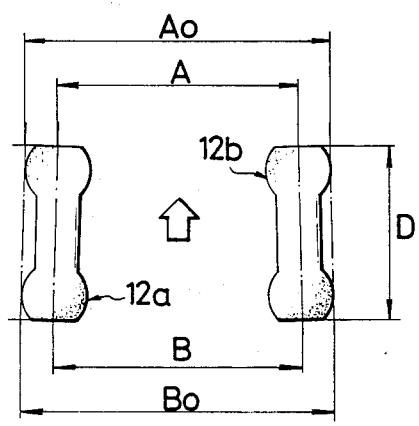

As shown in FIG. 5, the toe-in T is equal to the difference between the maximum distance B between the central vertical planes of the opposite wheels 12a, 12b, and the minimum distance A between the central vertical planes of the wheels 12a, 12b ($T=B-A$). The difference is the same as the difference between the maximum joint width of the opposite wheels 12a, 12b and the minimum joint width of the wheels 12a, 12b ($T=B-A=Bo-Ao$). The maximum and minimum joint widths Bo, Ao are obtained in accordance with the following equations (1) and (2), respectively.

$$Bo = 1-(F+H)/Do \cdot D \quad (1)$$

$$Ao = 1-(E+G)/Do \cdot D \quad (2)$$

In Equations (1) and (2), l is the distance between the opposed reference vertical planes, Do represents the central diameter of the tire 17, D is the outside diameter of the tire 17, and E, F, G or H is the distance between the tire side surface of each wheel 12a, 12b and the corresponding reference vertical plane, as measured on the central diameter Do of the tire 17 (see FIG. 4).

By Equations (1) and (2),
$$T = \{-(F+F)/Do\cdot D\} - \{1-(E+G)/Do\cdot D\}$$

Hence, we obtain the equation $$T = \{(E+G)-(F+H)\}/Do\cdot D \quad (3)$$

The distance E, F, G or H is determined by the equation
$$E=(a+b)/2, \quad F=(c+D)/2,$$
$$G=(e+f)/2 \text{ or } H=(g+h)/2$$

wherein a–h are the same as above.

It appears from the foregoing description that the toe-in can be computed based on the distances a–d which are detected by the respective sensors 16a–16d.

Then the operation proceeds to a step IX in which the computed toe-in is displaced on the display units 33, 35.

According to the present invention, it is also possible to adjust the position of the measuring units 12a, 12b to follow-up the lateral displacement of the wheels 12a–12b. This adjustment is achieved by displacing the measuring units 12a, 12b in such a manner that the equations: $a-e=b-f$ and $g-c=h-d$ are always satisfied.

When a camber angle $\theta c$ is to be measured, the guide member 18 is angularly moved from the horizontal position to a vertical position shown in FIG. 7. In the camber angle measurement, the microcomputer 27 proceeds the program stored therein in the same manner as done in the toe-in measurement described above. The camber angle $\theta c$ may be determined on the basis of the data regarding the distances detected by the sensors 16a–16c.

Obviously, many modifications and variations of the present invention are possible in the light of the above teachings. It is therefore to be understood that within the scope of the appended claims, the invention may be practiced otherwise than as specifically described.

What is claimed is:

1. A method of measuring wheel alignment of a motor vehicle, comprising the steps of:
   (a) rotating front and rear wheels of the motor vehicle while retaining the vehicle in a predetermined position;
   (b) optoelectronically measuring the distance beween a reference vertical plane and a side surface of each of the front and rear wheels;
   (c) during said measuring, adjusting the position of measurement to follow-up a displacement of each wheel in a direction parallel to the longitudinal axis of the vehicle;
   (d) electronically processing the data obtained by said measuring for computing at least one of a toe-in angle and a camber angle of each wheel; and
   (e) displaying the toe-in angle or the camber angle thus computed.

2. A method according to claim 1, said measuring being achieved for all of the front and rear wheels individually and synchronously.

3. A method according to claim 1, further including the step of fluidally keeping the initial distance between the reference vertical plane and the side surface of each wheel during said measuring.

4. An apparatus for measuring wheel alignment of a motor vehicle, comprising:
   (a) drive means for rotating front and rear wheels of the motor vehicle while retaining the vehicle in a predetermined position;
   (b) means for optoelectronically measuring the distance between a reference vertical plane and a side surface of each of the front and rear wheels;
   (c) means for adjusting the position of said measuring means to follow-up a displacement of each wheel in a direction parallel to the longitudinal axis of the vehicle;
   (d) computing means for electronically processing the data obtained by said measuring means to compute at least one of a toe-in angle and a camber angle of each wheel; and
   (e) means for displaying the toe-in angle or the camber angle thus computed.

5. An apparatus according to claim 4, said measuring means including two pairs of opposedly disposed measuring units between which the front and rear wheels are to be disposed, respectively, each said measuring unit including a respective linear support member operatively connected with said adjusting means to move in a direction paralalel to the longitudinal axis of the vehicle, and two pairs of photoelectric sensors mounted on said support member in alignment with each other and disposed in said reference vertical plane in confronting relation to a tire on each wheel, sensors being equidistantly spaced from a plane extending in tangent to a circle defining the central diameter of the tire.

6. An apparatus according to claim 5, said adjusting means including a stepping motor and a cam driven by said stepping motor and coupled with said support member for translating a rotary motion of said stepping motor to a linear reciprocating motion of support member in said direction.

7. An apparatus according to claim 4, further including means for adjusting the position of said measuring means to follow-up a displacement of each wheel in a direction perpendicular to the longitudinal axis of the vehicle.

8. An apparatus according to claim 7, said adjusting means comprising a fluid-actuated cylinder operatively connected with said measuring means.

9. An apparatus according to claim 4, said displaying means comprising an analog display unit.

10. An apparatus according to claim 4, said displaying means comprising a digital display unit.

11. An apparatus according to claim 4, said displaying means comprising a combination of an analog display unit and a digital display unit.

* * * * *